C. W. DAYTON.
PROCESS OF RIPENING EXTRACTED HONEY.
APPLICATION FILED FEB. 16, 1909.
1,000,239.
Patented Aug. 8, 1911.
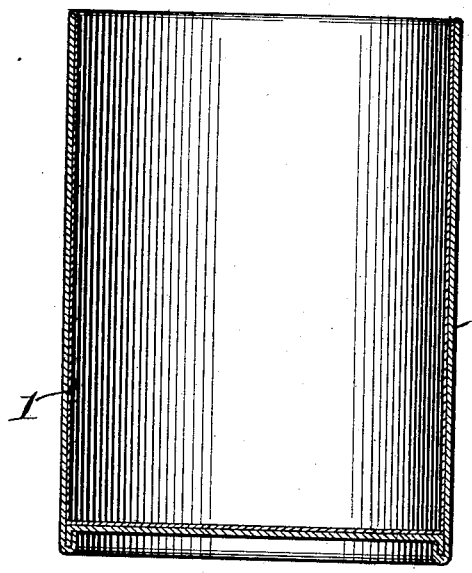
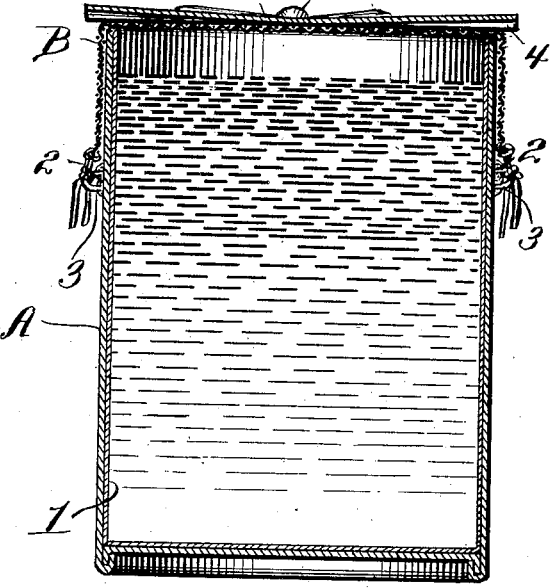
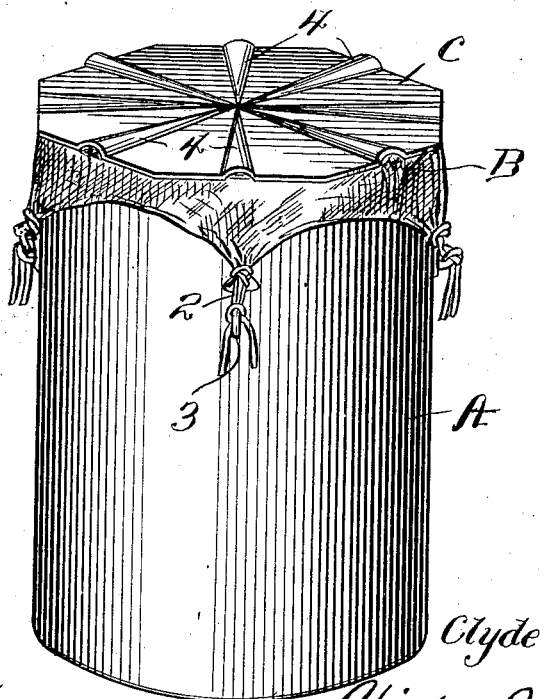
Witnesses
J. L. Wright
C. Bradway
Inventor
Clyde W. Dayton,
By Victor J. Evans,
Attorney

UNITED STATES PATENT OFFICE.

CLYDE W. DAYTON, OF CHATSWORTH, CALIFORNIA.

PROCESS OF RIPENING EXTRACTED HONEY.

1,000,239. Specification of Letters Patent. Patented Aug. 8, 1911.

Application filed February 16, 1909. Serial No. 478,280.

*To all whom it may concern:*

Be it known that I, CLYDE W. DAYTON, a citizen of the United States, residing at Chatsworth, in the county of Los Angeles and State of California, have invented new and useful Improvements in Processes for Ripening Extracted Honey, of which the following is a specification.

According to the common method of ripening honey employed by producers of machine-extracted honey, the extracted honey is placed in open top vessels or tanks which are covered with cloth for the purpose of evaporating the superfluous moisture from the new honey by the heat of the sun's rays, the process requiring one or two weeks. When honey is thus exposed to the direct heat of the sun, the ferment germs are unduly aroused into activity so that they grow and thrive during the night while the bulk of the honey is still warm. The excess of light and heat acting on the honey during the succeeding day destroys the ferment so that the remains thereof are left in the body of the honey, thereby discoloring or blackening the same, so that the quality is impaired and rendered less nutritious and salable. When such honey is stored in sealed cans, the gas continuing to rise out of the honey collects at the top where it condenses, and when the temperature lowers, the drops become larger and larger until they finally fall back into the honey. This condensed moisture with the gas that it contains, is impure and acid and consequently very destructive to the albuminous protecting film which naturally forms on the surface of the honey during the ripening. A further objection to this method resides in the fact that through well-known causes the flavor and quality of the honey is injured throughout its whole depth and granulation is induced and encouraged.

The object of the present invention is to provide an improved process by which these objections are overcome and a superior product obtained.

In the accompanying drawing, which discloses the apparatus by which the process of ripening honey is effected, Figure 1 is a central vertical section of the tank or container for the honey. Fig. 2 is a similar view showing the manner of protecting the honey during the ripening thereof from the ingress of moisture. Fig. 3 is a perspective view of Fig. 1.

In carrying out the method, the honey to be ripened is conducted directly from the gate of the extracting machine to the storage receptacle or can A, which is open at its top and which, preparatory to the deposit of the honey therein, is internally coated with paraffin, bee's-wax or the like, as indicated at 1, this coating serving to prevent the acids in the honey from attacking the metal or substance of which the container A is made. As soon as the honey begins to settle, an albumin-like film begins to form on the surface and it is essential that this film be left unbroken during the settling of the honey, as it protects the honey from injury by the intrusion of moisture from the surrounding atmosphere which may become exceedingly humid at times. In the absence of a film of a more nitrogenous composition than honey alone, moisture would soon condense and a layer of water would collect on the surface of the honey and consequently fermentation would soon start up and deterioration of the honey result. In order to prevent the condensation and collection of moisture on the honey, a cloth B is spread over the top of the receptacle A so as to arrest the entrance and sudden contact of the moisture-laden atmosphere, the cloth being somewhat porous, such, for instance, as unbleached muslin, whereby the porosity permits the gas rising from the honey to readily escape from the atmosphere without moisture entering through the pores. This cloth is held in place in any suitable manner by being sufficiently large to hang down over the outside of the receptacle A and the edges of the cloth can be tied by strings 2 to eyelets 3 on the receptacle, or, if desired, small weights may be employed. To retard the rapid or sudden ingress of air still further, the receptacle may be provided with a cover C such as sheet of metal, wood or the like, which is so constructed as not to form a total seal for the receptacle. For instance, flutes 4 may be provided in the cover C so as to provide a ready vent for a slow draft of air toward the inside or the exit of gas from the receptacle to the atmosphere and through the cloth. The extent of this draft is governed by the variations in temperature of the surrounding atmosphere. The cloth will catch and hold an excessive moisture tending to pass inwardly with the air, and the cloth also readily admits of the passage outwardly of the gas when the honey is warmer than the outside atmosphere. The ripening process of the present method continues for a greater or less length of time, according to the purification desired. The object of the ripening process is to remove the undeveloped protoplasmic plant cells derived from the blossoms from which the honey is gathered by the bees. The removal and expulsion progresses by a ferment identical to the "sweating" of grain in a bin, meaning thereby the wasting or decaying of the unfinished vegetable cells which remain in the grain or, in the present case, in the honey. The gas liberated from the honey passes off through the ventilated receptacle so that there will be no objectionable taint in the honey as is produced when the honey is placed in sealed cans during this process of "sweating" or fermentation. By this method of storing and curing liquid honey, the quality and texture is improved and rendered more digestible, milder in flavor, and thus more agreeable to the taste, less irritating to the stomach and free from deleterious properties.

What I claim as new and desire to secure by Letters Patent, is:—

The herein-described process of ripening honey, which consists in confining a body of honey from communication with the atmosphere except at one surface, interposing a moisture-absorbing barrier between said surface and the atmosphere so as to provide a space or chamber between said surface and barrier to receive the gases evolved from the honey and a body of air admitted slowly through the barrier, whereby a slowly changing body of relatively still air may be maintained between said surface and the outer atmosphere, and preventing any material or sudden access of air to or discharge of air from said space through said barrier, while permitting of a slow and uniform ingress and egress of air.

In testimony whereof I affix my signature in presence of two witnesses.

CLYDE W. DAYTON.

Witnesses:
ALONZO L. HUGHES,
AUGUST SCHWEIKHARD.